United States Patent [19]

Hultsch

[11] Patent Number: 5,032,258

[45] Date of Patent: Jul. 16, 1991

[54] FILTER CENTRIFUGE FOR SEPARATING SUSPENSIONS WITH SYSTEM TO RELEASE ACCUMULATED GAS

[75] Inventor: Günther Hultsch, Oberschleissheim, Fed. Rep. of Germany

[73] Assignee: Krauss-Maffei Aktiengesellschaft, Munich, Fed. Rep. of Germany

[21] Appl. No.: 348,282

[22] Filed: May 5, 1989

[30] Foreign Application Priority Data

May 19, 1988 [DE] Fed. Rep. of Germany ....... 3817126

[51] Int. Cl.[5] ........................ B01D 21/26; B01D 35/01

[52] U.S. Cl. ................................ 210/120; 210/380.1; 210/472

[58] Field of Search .................. 137/140; 210/97, 188, 210/360.1, 378, 380.1, 380.3, 741, 390, 781, 120, 137, 472; 494/36, 61

[56] References Cited

U.S. PATENT DOCUMENTS

| | | | |
|---|---|---|---|
| 1,190,842 | 7/1916 | Atkins | 210/472 |
| 3,377,019 | 4/1968 | Cox | 210/380.3 |
| 3,623,658 | 11/1971 | Garbaty | 210/97 |
| 3,864,256 | 2/1975 | Hultsch et al. | 210/378 |
| 3,943,056 | 3/1976 | Hultsch et al. | 210/378 |
| 4,052,303 | 10/1977 | Hultsch et al. | 210/378 |
| 4,095,615 | 6/1978 | Ramsauer | 137/140 |
| 4,101,421 | 7/1978 | Hultsch | 210/378 |
| 4,265,764 | 5/1981 | Gallottini | 210/390 |
| 4,759,857 | 7/1988 | Acuna | 210/741 |
| 4,895,666 | 1/1990 | Franzen et al. | 210/378 |

FOREIGN PATENT DOCUMENTS

| | | | |
|---|---|---|---|
| 0302464 | 2/1989 | European Pat. Off. | 494/36 |
| 2028267 | 12/1971 | Fed. Rep. of Germany | 494/61 |
| 2260461 | 6/1980 | Fed. Rep. of Germany | 210/380.3 |
| 2424530 | 12/1979 | France | 210/781 |
| 2496498 | 6/1982 | France | 494/36 |
| 580986 | 10/1976 | Switzerland | 210/380.3 |
| 787951 | 12/1980 | U.S.S.R. | 210/741 |

*Primary Examiner*—Robert A. Dawson
*Assistant Examiner*—Joseph Drodge
*Attorney, Agent, or Firm*—Herbert Dubno; Andrew Wilford

[57] ABSTRACT

A nonreturn valve connected to a passage venting a gas-containing part of the filtrate collection chamber is located in a centrifuge drum base is operated as a siphon to increase the pressure differential, thus filtration rate, across the centrifuge filter or alternatively a system of rotatable siphon cups connected to the chamber are provided so that gas collecting in the collection chamber during filtration may be evacuated of the centrifuge. This device can also be used in the discontinuously operating filter centrifuge with a rotating siphon whose housing interior is at the pressure of the surroundings or is acted on with a gas pressure for additional acceleration of the filtration.

3 Claims, 4 Drawing Sheets

FILTER CENTRIFUGE FOR SEPARATING SUSPENSIONS WITH SYSTEM TO RELEASE ACCUMULATED GAS

FIELD OF THE INVENTION

My present invention relates to a centrifuge and, more particularly, to a filter centrifuge for separating solids from liquids in suspensions.

BACKGROUND OF THE INVENTION

Filter centrifuges are described inter alia in U.S. Pat. No. 3,943,056 corresponding to German patent 22 60 461, Swiss patent 580,986 and the aforementioned German patent itself.

The known centrifuge of this type comprises a centrifugal drum with a coaxial filter means and a collection chamber for filtrate equipped with at least one drain located radially exterior to the filter means. A siphoning device, which temporarily prevents a gas feed into the collection chamber, is connected to the collection chamber and rotates along with it.

According to German Patent 22 60 461, the siphon device rotating with and mounted on the centrifugal drum separates the filtrate from the suspension after it has passed through the filter means and the collection chamber, flowing through the siphon while excluding gas from the filtrate path.

The filtrate arrives in a ring-like cup mounted on the outer side of the drum and is conducted away from it, e.g. by a takeoff pipe which can be swung into and out of action. The takeoff pipe acts simultaneously to adjust the fluid level in the ring-like cup. If this level drops in a region radially outside the filter means, the siphon device causes a pressure drop below the filter means relative to the pressure in the centrifugal housing.

Hence the driving force, which causes the filtration, is increased relative to that in a conventional centrifuge by a pressure difference which exists between the surfaces of the filter cake and the collection chamber and the filtration accelerates.

The pressure difference returns to its original value when the filtrate delivers the gaseous components to the collection chamber under the filter means or when the gas passes through the filter means.

After each centrifuge loading, i.e. after the filter cake has been removed from the drum, with the apparatus according to German Patent 22 60 461 gas forced into the collection chamber is forced out. The fluid is filled into the ring-like cup of the siphon device and the takeoff pipe swung out from the ring-like cup.

As a result a pressure drop relative to the filter means exists and the gas forced in is driven through the filter means.

The forcing out of the gas is however only possible when the filter cake has been removed up to a residual layer. If the filter cake is still in the drum, the resistance to removal of the gas through the filter cake is too great and also the filtration becomes very difficult in that case.

OBJECT OF THE INVENTION

It is an object of my invention to provide a filter centrifuge in which, during centrifuge loading, gas forced into the collection chamber is quickly forced out into the housing surrounding the drum.

SUMMARY OF THE INVENTION

These objects and others which will become more readily apparent hereinafter are attained in accordance with my invention in a filter centrifuge of the above-described type.

According to my invention the centrifuge further comprises at least one gas release passage which connects the collection chamber with the space in the centrifuge housing outside of it and which connects with a device for pressure-dependent release of gas forced-in through the filter means.

This device for pressure-dependent gas release can be a nonreturn valve which opens at a slight overpressure in the collection chamber relative to the pressure in the centrifuge housing outside of it.

Alternatively the device for pressure-dependent release comprises an additional siphon device rotating with the drum filled with fluid and equipped so that on a slight pressure drop from the collection chamber to the housing gas from the collection chamber flows into the housing space and gas shutoff is guaranteed on a larger pressure drop from the housing to the collection chamber.

A ring-like cup can be connected with the gas release passage and means for feeding of the fluid through the ring-like cup can be provided, with which the gas forced into a ring-like collection chamber can be forced out by the device for pressure dependent gas release.

The siphon device can comprise a siphon cup connected with the gas release passage by a horizontal branch thereof and a refill pipe for the siphon cup which can be pivoted into and out of connection with the siphon cup.

In a particularly simple and desirable construction, a pressure sensor is mounted in the filtrate collection chamber which reports pressure values to a controller. Then as soon as a set pressure is reached in the collection chamber or below it, the ring cup of a rotating siphon is filled.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
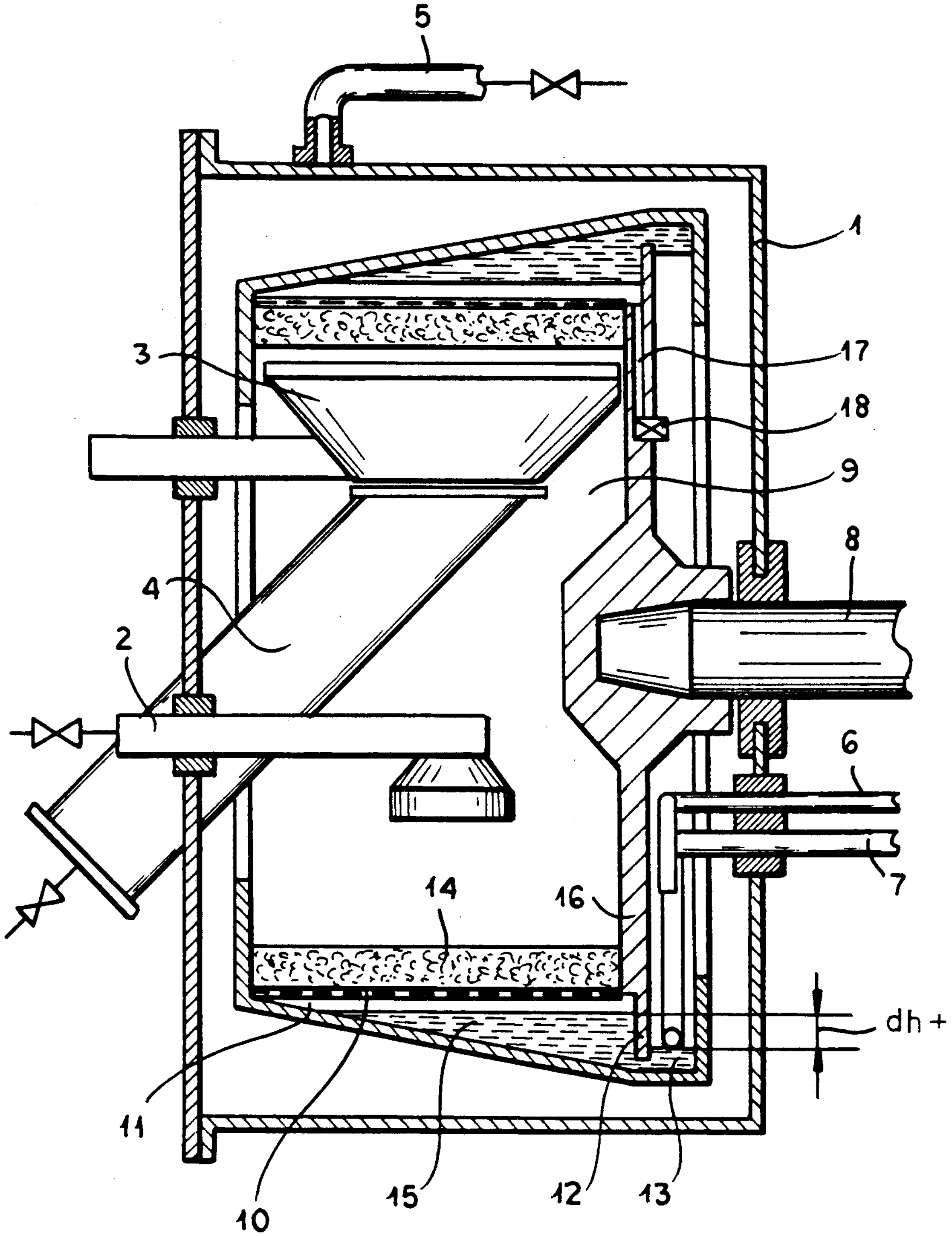
FIG. 1 is a cross sectional view through a centrifuge with a filter means according to my invention having a rotating siphon and a nonreturn valve for venting gas from the collection chamber.

The particular centrifuge shown in FIG. 1 has a feed and discharge pipe 2, a peeling knife 3, a solids chute 4, an overpressure release valve 5, a flush back pipe 6 and a filtrate takeoff pipe 7.

A siphon drum 9 with filter means 10, collection chamber 11, siphon disk 12 and ring-like cup 13 is mounted on the shaft 8. According to the drawing a filter cake 14 is present on the filter means 10. The collection chamber 11 is partially filled with filtrate fluid 15, which has a lower level (radial distance larger) in the ring-like cup. At least one gas release passage 17 and at least one nonreturn valve 18 are mounted in the drum rear wall 16.

According to FIGS. 2 to 5 a radially outwardly directed pipe 20 is connected to a horizontal branch 19 of the gas release passage 17. This radially direct pipe 20 is immersed in the siphon cup 21 when fluid is fed through the refill pipe 22.

The operation of the apparatus according to FIG. 1 is as follows:

Before loading the centrifuge both the ring-like cup 13 and the collection chamber 11 are nearly completely filled with fluid through the flush back pipe 6 with the filtrate takeoff pipe 7 swung out.

Subsequently the centrifugal drum is fed suspension through the feed and discharge pipe 2. Then the filtrate takeoff pipe is swung into the circular cup 13 and the fluid level in the ring-like cup 13 drops relative to the level in the collection chamber 11. As a consequence of this a reduced pressure relative to the surrounding housing exists under the filter means 10. The pressure difference is determined by the accelerated mass of the fluid column dh+. Thus using water as the fluid and with an acceleration of $1000 \times 9.81$ m/s$^2$ and a dh+ of 20 mm a pressure difference of 2 bar is produced. However if gas ruptures the filter cake or the filtrate degases so that an increasing gas cushion is formed in the collection chamber 11, dh+ and the additional pressure drop are less.

To reproduce the pressure difference accelerating the filtration the filter takeoff pipe is swung out anew and fluid filled into the ring-like cup 13 through the flush back pipe 6. Hence a reversed pressure drop from the collection chamber 11 to the housing inner chamber is produced by the fluid column dh− and because of this the gas from the collection chamber 11 is forced through the gas release passage 17 and the nonreturn valve 18. This process causes only a brief reduction of the filtration speed, because it can be performed in about 20s.

Subsequently the filtrate takeoff pipe 7 is again pivoted in so that the nonreturn valve automatically closes and dh+ is again its maximum value.

In the embodiment of FIGS. 2 to 5 instead of a nonreturn valve 18 an additional siphon device is used. This additional siphon device comprises a horizontal branch 19 of the gas release passage 17 connected to a down pipe 20, whose lower end 21' is immersed in a siphon cup 21. To produce the desired valve action fluid is filled in the siphon cup 21 through a refill pipe 22 which is also part of the device. The refill pipe 22 can simultaneously take the function of the flush back pipe 6 in the above embodiment because fluid overflowing from the small siphon cup 21 arrives in the ring-like cup 13.

Figure 2:
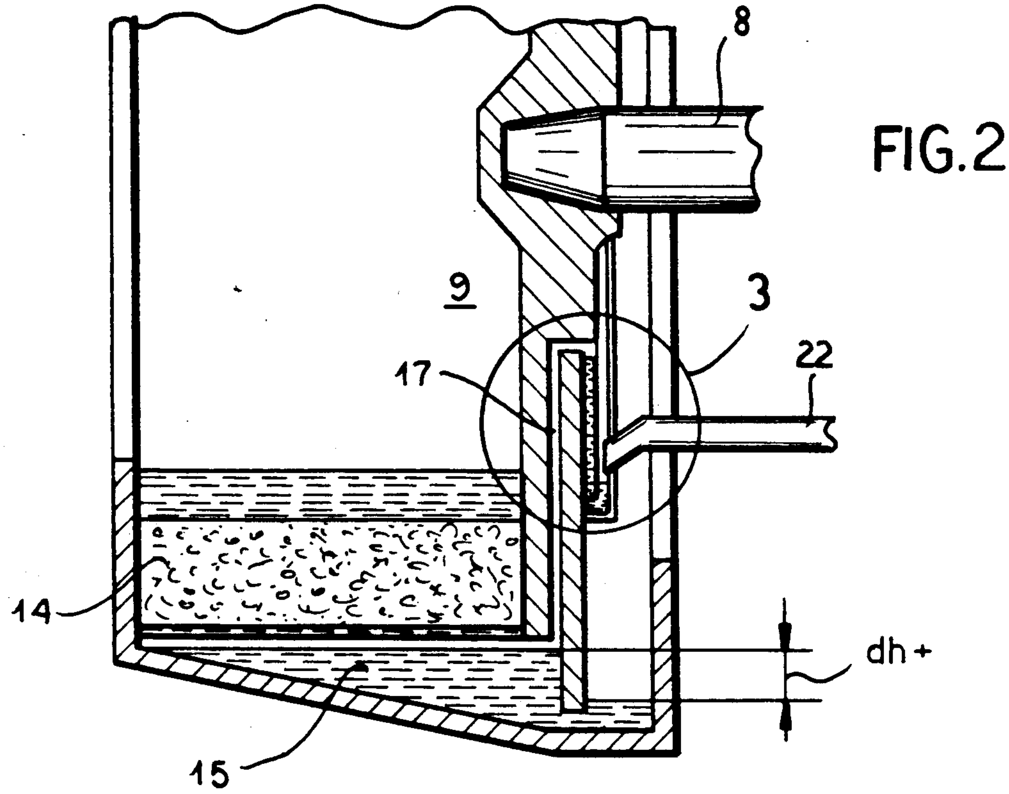
FIG. 2 is a cutaway cross sectional view through another embodiment of a filter centrifuge according to my invention in which instead of a nonreturn valve an additional siphon device which serves alternately for preventing gas venting and for gas venting is shown in the state in which gas venting is prevented.

FIG. 2 shows the second embodiment of my invention in the "filtering" operation state in which the interior pressure of the centrifugal housing is larger than the pressure in the collection chamber 11, both fluid columns dh+ producing the same hydrostatic pressures. Because the fluid column dh+ in the down pipe 20 is subjected to a reduced centrifugal acceleration relative to the column between the collection chamber 11 and the ring-like cup 13, this inner column lying radially interior has a larger radial extent. Both columns cause a gas shutoff at or prevent venting of the collection chamber 11.

Figure 3:
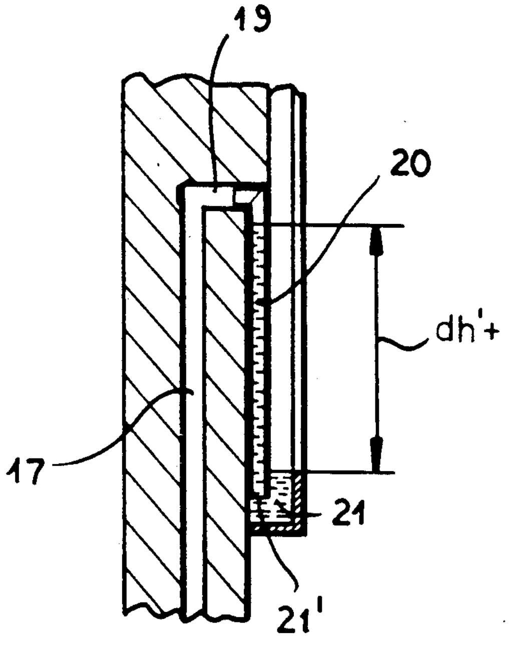
FIG. 3 is a more detailed view of a portion of the apparatus shown in FIG. 2 indicated with the circle III in FIG. 2.
Figure 4:
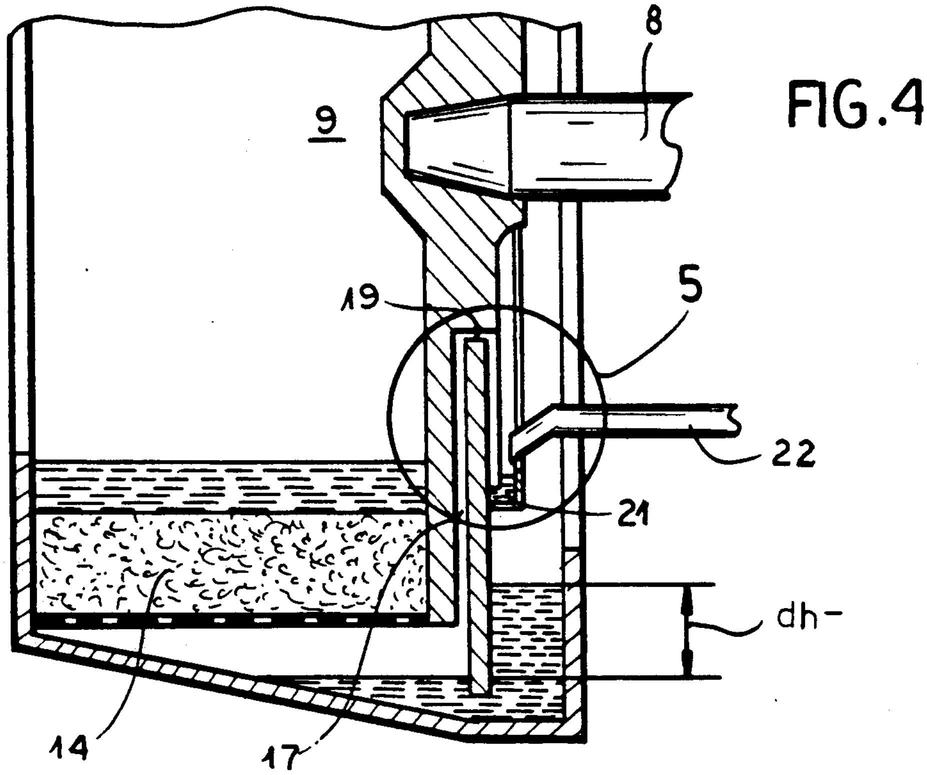
FIG. 4 is a cutaway cross sectional view through the centrifuge shown in FIG. 2 similar to that of FIG. 2 in gas discharging state.
Figure 5:
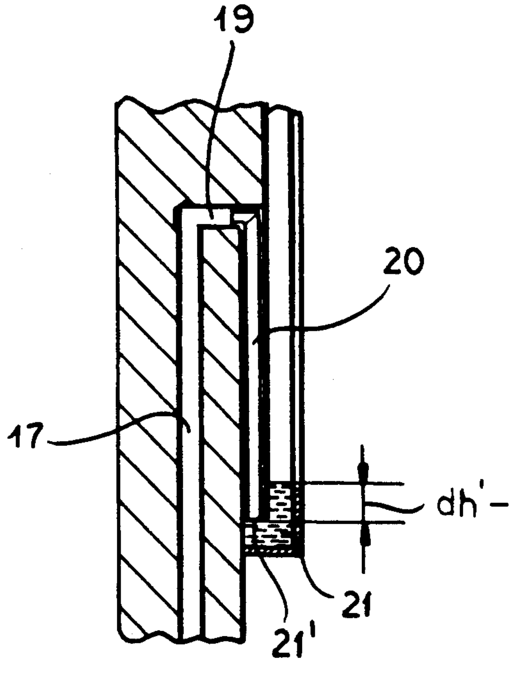
FIG. 5 is a more detailed view of a portion of the apparatus shown in FIG. 4 indicated with the circle V in FIG. 4.

FIG. 3 shows the apparatus in a "forcing out" state. Since gas is forced in the collection chamber from the filtrate fluid and/or through the filter cake, it must be forced out. According to operation with the refill pipe 22 simultaneously fluid is filled into the siphon cup 21 and the ring-like cup 13. As a result of this the fluid column dh+ forces the gas forced into the collection chamber 11 through the down pipe 20. Because dh− can take only a reduced value in the siphon cup 21 because of the low rim ring, the gas bubbles through this siphon cup into the housing interior chamber. The lower rim ring of the siphon cup 21 can be kept very low, because its cross sectional surface area is many times that of the down pipe 20. Thus in the "filtering" operation according to FIG. 2 a reduced level drop in the siphon cup 21 suffices to build a fluid column dh+ in the down pipe 20 corresponding to the pressure difference. Otherwise fluid must be fed in through the refill pipe 22.

The advantages of the apparatus according to my invention are not limited to the forcing out of gas during centrifugation.

The apparatus can also be used advantageously when the solid matter is removed leaving a residual layer. In this case fluid must already be filled in the ring-like cup 13 with the takeoff pipe 7 swung away to force out gas before subsequent feed in and on the other hand to regenerate the residual layer on the filter means by back rinsing.

When the resistance of the residual layer and the filter means is large, this process is on the one hand time-consuming and on the other hand difficult to control. The volume flow of the fluid must be adjusted to the resistance of the different quantities of centrifuged material which can be large and variable.

If this volume flow was too large, a portion of the unused fluid runs over the rim ring of the ring-like cup into the centrifuge housing. Thus, when the collection chamber 11 was filled with gas, a considerable pressure against the filter means 10 could arise because of the length of the fluid column dh−. This could go on until the filter means 10 becomes damaged.

With the apparatus according to my invention, however, the pressure in the collection chamber 11 can be only as large as the resistance of the gas venting or discharge device allows. When the fluid reaches the filter means 10 of the collection compartment 11, a pressure difference of a small column dh− still remains and the filter means 10 is still effective and fluid still flows through it.

Figure 6:
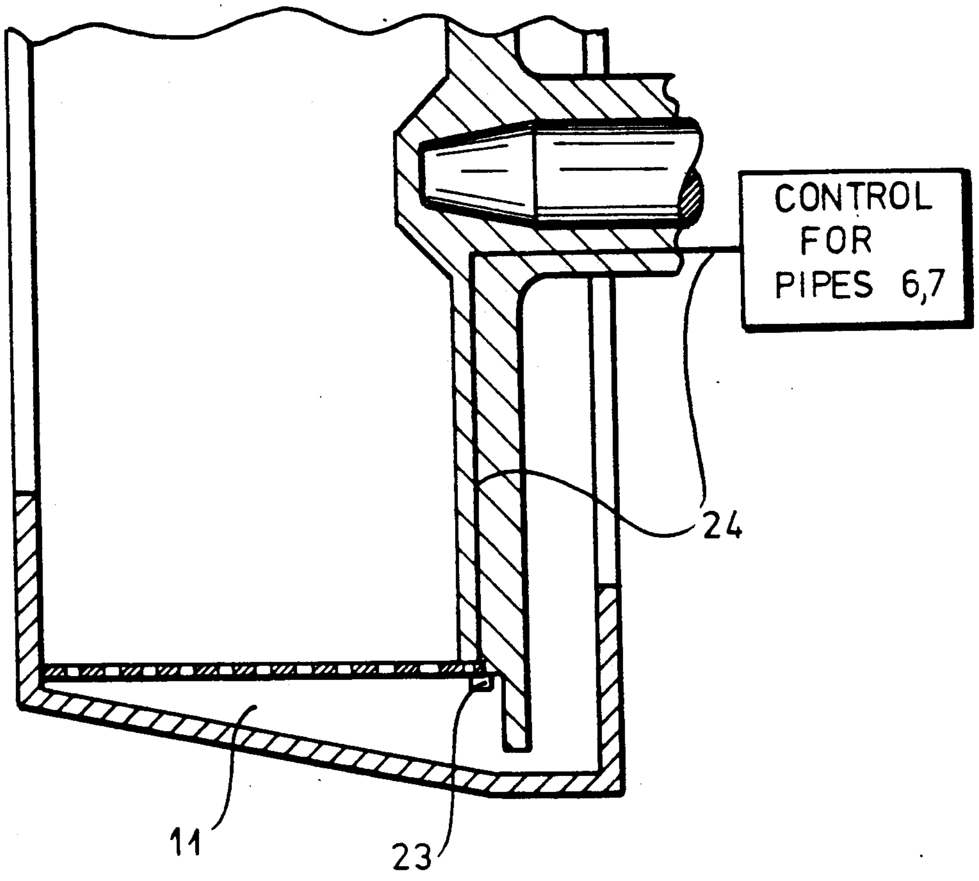
FIG. 6 is a cutaway cross sectional view through a centrifuge according to my invention with a rotating siphon and a pressure sensor in the filtrate collection chamber.

FIG. 6 shows a different embodiment of the centrifuge of my invention. A pressure sensor 23 is located in the filtrate collection chamber 11, which reports measured pressure values to the controller or computer-analyzer over a cable 24 and collector ring or transmitter not shown in the drawing. Hence the forcing of gas from the collection chamber 11 to the centrifuge housing 1 which depends on pressure is controllable. As soon as a chosen set pressure in the collection chamber and/or below the filter means 10 is exceeded the filtrate takeoff pipe 7 is pivoted out and fluid is filled into the ring cup 13 through the flush back pipe 6.

Because of the new apparatus according to my invention the fluid fed to the ring-like cup 13 can be metered exactly and overflow over the rim ring of the ring-like cup 13 is effectively avoided.

In the following claims by the "device for pressure-dependent release of gas forced-in through the filter means" I mean the "nonreturn valve" in the above-mentioned embodiment of FIG. 1 and the additional siphon device in the embodiment of FIGS. 2 to 5 which is defined above.

I claim:

1. A centrifuge comprising:

a centrifuge housing;

a centrifuge drum in said housing rotatable about an axis of rotation, said drum being provided with a rear wall, with filter means for filtering a suspension introduced into said drum and with an outer peripheral wall, said filter means including an annular foraminous inner wall centered on said axis and supporting a filter cake upon introduction of the suspension into said drum;

a collection chamber located between said outer peripheral and inner foraminous walls for filtrate, said collection chamber being formed with an inner gas-containing part spaced radially outward from said foraminous wall and an outer filtrate-containing part located between said outer peripheral wall and said gas-containing part, said chamber being provided with at least one drain positioned radially exterior to said filter means;

means for preventing entry of gas into said collection chamber except for entry through said filter means, said means for preventing being a siphon including a filtrate-containing cup of a further chamber communicating directly with said filtrate-containing part of the collection chamber, said cup and said liquid-containing part having different levels of said filtrate building a pressure differential between said part and said cup upon feeding said cup with the liquid, said siphon being rotatable about said axis; and at least one gas-release passage formed in said rear wall and having a radially outer end opening into said gas-containing part and a radially inner end opening into said housing, said release passage extending radially inward from said filtrate-containing part of said collection chamber, the outer end of said passage being provided with a nonreturn valve disposed radially inward of said collection chamber on said drum for pressure-dependent release of gas accumulated in said collection chamber into said housing.

2. A centrifuge comprising:

a centrifuge housing;

a drum rotatable in said housing about an axis of rotation and formed with an outer peripheral wall and with support means for receiving a filter cake upon introduction of a suspension to be filtered into said centrifugal drum, said support means being an annular foraminous inner peripheral wall centered on said axis;

a collection chamber for filtrate formed between said inner and outer peripheral walls, said collection chamber being provided with a one drain positioned radially exterior to said inner wall and with a partition extending radially into said chamber and provided with said drain;

a first siphon cup axially offset from and directly connected with said collection chamber by said drain, said first siphon cup being rotatable with said drum about said axis, said first siphon cup and said chamber being separated partially by said partition and having different levels of said filtrate therein;

a siphon connected to said collection chamber for pressure-dependent release of gas accumulated in said collection chamber upon filtration, said siphon being rotatable about said axis and provided with means on said drum forming a second siphon cup spaced radially inward from said first siphon cup on said drum;

at least one gas release passage extending radially inward from said collection chamber and formed with a branch extending parallel to said axis and connecting said passage with a further passage extending radially outwardly from said branch and leading to said second siphon cup, said gas release passage being connected with said collection chamber, said first siphon cup being intermittently filled with said filtrate building a pressure in said first cup so that gas accumulated in said collection chamber is forced through said passage and through said second siphon cup into said housing.

3. A centrifuge comprising:

a centrifuge housing;

a drum rotatable in said housing about an axis of rotation and formed with an outer peripheral wall and with support means for receiving a filter cake upon introduction of a suspension to be filtered into said centrifugal drum, said support means being an annular foraminous inner peripheral wall centered on said axis;

a collection chamber for filtrate formed between said foraminous inner and outer peripheral walls, said chamber being formed with an outer filtrate-containing part adjacent said outer peripheral wall of said drum and an inner gas-containing part inward of said filtrate-containing part;

means for inducing a suction pressure head radially across said filtrate in said collection chamber, said means being rotatable about said axis and including a compartment communicating directly with said filtrate-containing part of said chamber;

a siphon connected to said collection chamber for pressure-dependent releasing of gas accumulated in said gas-containing part of the collection chamber upon filtration, said siphon being rotatable about said axis and provided with a siphon cup located on the wall of the drum and spaced radially inwardly from said compartment in said housing, said cup being operatively connected with said compartment so that said compartment and said filtrate-containing part have different levels of the liquid;

a feed pipe radially exterior from said collection chamber and pivotable into and out of connection with said siphon cup filling it with the filtrate and thereby building a pressure differential between said collection chamber and said compartment; and at least one gas-release passage extending radially inward from said collection chamber in said drum and formed with a branch thereof extending parallel to said axis and connecting said passage with said siphon cup, said release passage being connected with said gas-containing part of said collection chamber, said gas accumulated in said collection chamber being forced through said gas-release passage and through said siphon cup out of said chamber upon said feed pipe being into connection with said siphon cup for feeding said compartment.

* * * * *